United States Patent [19]

Mudd

[11] Patent Number: 5,660,207

[45] Date of Patent: Aug. 26, 1997

[54] FLOW CONTROLLER, PARTS OF FLOW CONTROLLER, AND RELATED METHOD

[75] Inventor: Daniel T. Mudd, Long Beach, Calif.

[73] Assignee: Tylan General, Inc., San Diego, Calif.

[21] Appl. No.: 365,861

[22] Filed: Dec. 29, 1994

[51] Int. Cl.[6] ........................................... G05D 7/06
[52] U.S. Cl. ..................... 137/599.1; 73/202; 73/204.21; 137/486; 137/44; 285/205; 285/382
[58] Field of Search ................................. 73/202, 204.21; 138/44; 137/486, 599.1; 285/205, 211, 382

[56] References Cited

U.S. PATENT DOCUMENTS

| | | |
|---|---|---|
| 2,313,128 | 3/1943 | Densten . |
| 2,675,508 | 4/1954 | Ray . |
| 2,726,559 | 12/1955 | Giulio . |
| 2,764,996 | 10/1956 | Brown . |
| 2,902,221 | 6/1959 | Hajny . |
| 3,570,807 | 3/1971 | Sturman . |
| 4,027,689 | 6/1977 | Wolfe . |
| 4,099,703 | 7/1978 | Lush . |
| 4,522,058 | 6/1985 | Ewing . |
| 4,524,616 | 6/1985 | Drexel et al. . |
| 4,571,801 | 2/1986 | Ewing . |
| 4,654,052 | 3/1987 | Sharp . |
| 4,666,126 | 5/1987 | Tujimura et al. . |
| 4,695,034 | 9/1987 | Shimizu . |
| 4,800,754 | 1/1989 | Korpi . |
| 5,027,857 | 7/1991 | Champseix . |
| 5,040,559 | 8/1991 | Ewing . |
| 5,044,199 | 9/1991 | Drexel et al. . |
| 5,086,801 | 2/1992 | Peacock et al. . |
| 5,099,881 | 3/1992 | Nakajima . |
| 5,100,100 | 3/1992 | Benson . |
| 5,165,655 | 11/1992 | Drexel et al. . |
| 5,228,338 | 7/1993 | Saghatchi . |
| 5,253,520 | 10/1993 | Drexel et al. . |
| 5,305,638 | 4/1994 | Saghatchi et al. . |
| 5,309,762 | 5/1994 | Satoh et al. . |
| 5,314,164 | 5/1994 | Smith . |
| 5,341,566 | 8/1994 | Quitschau et al. . |
| 5,361,800 | 11/1994 | Ewing . |
| 5,371,828 | 12/1994 | Ewing . |

FOREIGN PATENT DOCUMENTS

| | | |
|---|---|---|
| 0 129 012 A1 | 12/1984 | European Pat. Off. . |
| A-0278861 B1 | 8/1988 | European Pat. Off. . |
| 0 428 364 A1 | 5/1991 | European Pat. Off. . |
| 2 221 975 | 2/1990 | United Kingdom . |

OTHER PUBLICATIONS

Excerpt from advertisement for commercial product (Burkett 330) of Burkett Control-matic of Orange, California.

*Primary Examiner*—Gerald A. Michalsky
*Attorney, Agent, or Firm*—Robbins, Berliner & Carson, LLP

[57] ABSTRACT

A mass fluid flow controller has a valve which is controlled by a controller rod which is substantially pivotally mounted on a metallic diaphragm which stretches and unstretches with the movement of the rod. The actuation of the rod movement is by the expansion and contraction of an actuator wire which is heated for the expansion and allowed to cool for the contraction. The primary fluid flow path through the controller is straight. A sensor conduit, providing a parallel sensor fluid flow path, is connected in position using metallic sealer members which extend into openings to the primary fluid flow path and which are rounded along the direction through such openings. The pressure drop, along the primary fluid flow path, to create flow through the sensor conduit, is provided by a fluid flow restrictor having a core and having lengths of wire along the core which are squeezed between the core and a tapered fluid flow path wall in the vicinity of the sensor conduit input and output connections. A spherical or a conical shape may be used for the form of the core. A valve seat bushing is mounted in pipe structure providing the primary fluid flow path by applying a force against an end surface of the bushing, with movement of the bushing blocked, in order to deform the end surface, push the outer wall of the bushing against the inner wall of the pipe structure, and fix the bushing in the pipe structure.

21 Claims, 7 Drawing Sheets

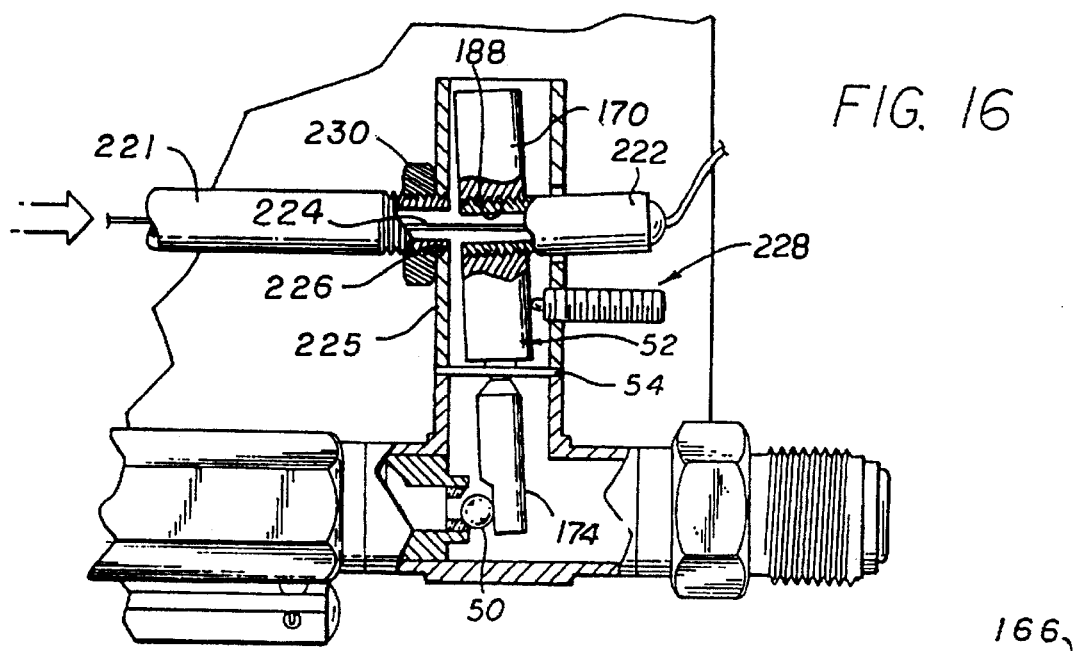
FIG. 16
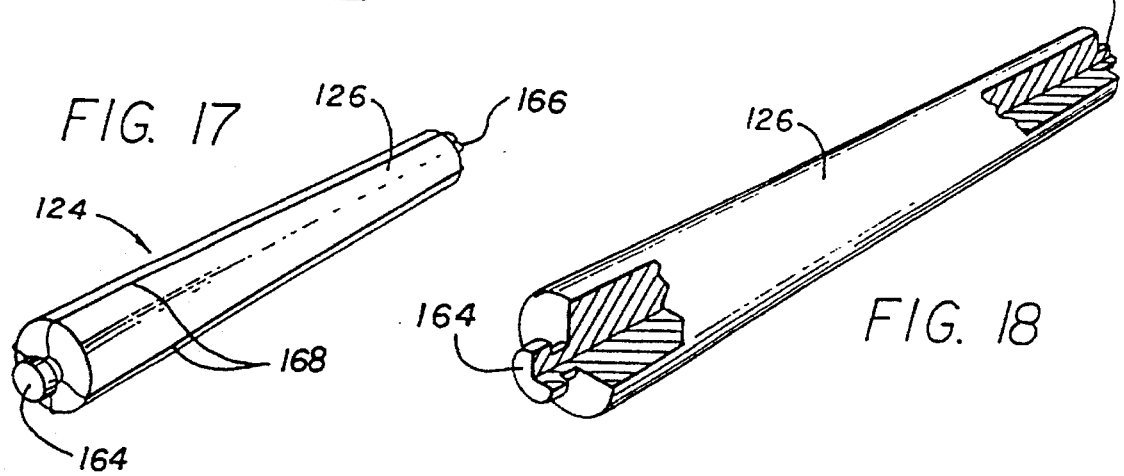
FIG. 17
FIG. 18
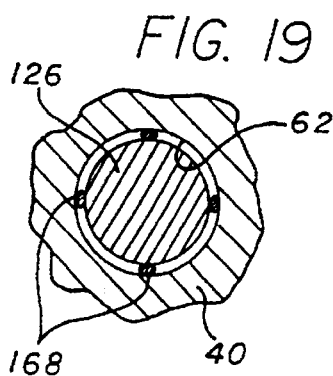
FIG. 19
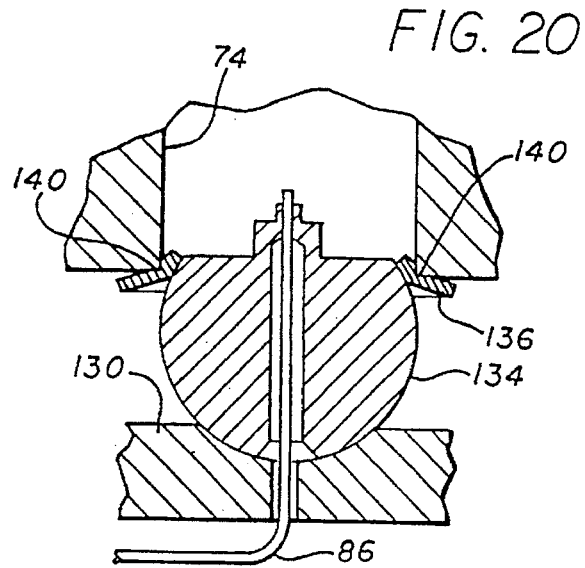
FIG. 20

FLOW CONTROLLER, PARTS OF FLOW CONTROLLER, AND RELATED METHOD

FIELD OF THE INVENTION

The field of the invention pertains to flow controllers, parts of flow controllers and methods of making such items.

BACKGROUND OF THE INVENTION

Mass flow controllers for gases sense the mass flow rate of a gas substantially independently of gas temperature or pressure, provide a measurement, and thus meter such flow, and adjust the mass flow rate, as desired, based on such sensing and metering. Forms of such controllers which operate on heat transfer principles have been widely adopted.

A common commercial form of a mass flow sensor for a gas incorporates a small diameter tube which has two coils of wire wound on the outside in close proximity to each other. The coils are formed from a metallic material having a resistance which is temperature-sensitive.

In a bridge-type electrical circuit, incorporated into the sensor, the coils can then be heated by an electrical current to provide equal resistances in the absence of flow of the gas and a balanced condition for the bridge-type circuit—e.g., a null output signal.

Then, with the gas flowing within the tube, within the relevant measuring range of the sensor, the temperature of the upstream coil is decreased by the cooling effect of the gas and the temperature of the downstream coil is increased by the heat from the upstream coil transmitted by the fluid. This difference in temperature is proportional to the number of molecules per unit time flowing through the tube. Therefore, based on the known variation of resistance of the coils with temperature, the output signal of the bridge circuit provides a measure, or a meter signal, of the gas mass flow.

Typically, the small diameter tube is in parallel with the primary fluid flow route through the controller. And this parallel path is set up using some form of partial fluid flow blockage setting up a pressure drop along the primary path.

With the flow measurement at a given level, and a desired flow setting at a different level, the difference can be eliminated, i.e., the mass flow rate Can be controlled, through a valve in the primary fluid flow path.

Typically, in mass flow controllers, the primary fluid flow path is somewhat circuitous to allow for the mounting of a valve seat in a valve sleeve, which is opened or closed in a linear fashion. Thus, the member which is moved to increase or decrease the fluid flow through the valve is typically moved through a force applied along the direction of the fluid flow (the direction through the opening of the valve seat). Typically, the member acting against the valve seat is moved by a structure having a position which is controlled by a solenoid or piezo-electric mechanism, and is often attached to a metallic diaphragm. Such circuitous flow path and linear mechanisms tend to require custom-made conduit parts and larger and/or more forceful mechanisms than may otherwise be desirable. They also tend to be sensitive to back-pressure effects in the primary flow path which may complicate the mechanical operation of the valve.

Somewhat related to all this is a manufacturing requirement that can occur, relating to the mounting of a sleeve containing the valve seat in the primary fluid flow path. Specifically, there may be a requirement to avoid scratching along the primary fluid flow path in putting this sleeve in position. Where, for example, a press-fit operation is used, the inevitable scratching, then, should occur along wall surfaces which do not contact the fluid during fluid flow.

Concerning the need for some blockage of the primary fluid flow path in connection with providing a parallel path through the small diameter sensor tube, a variety of blockage elements have been used and attempted. This includes, for example, employing a primary fluid flow path having a taper, and a blockage structure having a taper which can be positioned, and then held in position through a spring-like mounting mechanism. Of concern in all this is some need to maintain rather smooth, typically laminar-type flow, in some vicinity of the location of the sensor-tube parallel path, and the capability to adjust the amount of blockage in order to adjust the ratio of flow through the sensor tube to flow through the primary path. This capability to adjust permits calibrating, within certain ranges, the flow rate which a given sensor signal represents. Such calibration flexibility is important in satisfying a variety of uses and individualized requirements.

In accordance with this, a ball-like member having ear-like projections, and a cut or cuts near one or more of such projections to provide a spring-like capability, has been used as such a blockage element. Also, with regard to fluid flow blockage and adjustment, a generally circular, cylindrical bore with a generally circular, cylindrical plug having wire-like structures along its length, as a blockage arrangement, is known. Then, the length of the cylindrical blockage element which is disposed in the like-shaped bore can be used as a way of controlling the degree of blockage.

In mass flow controllers of the general type noted, another area of effort and concern has been in interfacing the small-diameter sensor tube and the primary fluid flow path. This interfacing, of course, occurs in the vicinity of the blockage element in the primary fluid flow path. Such interfacing involves a small-diameter tube and the need for its sealed communication, at either end, with openings to the primary fluid flow path. Exemplary of the conventional responses to this requirement is the incorporation of a metallic mounting block disposed between the sensor housing and the metallic conduit block in this vicinity through which the primary fluid flow path is bored. Such a block, then, has generally circular, cylindrical openings formed in it through which the sensor tube passes, at its ends, just prior to the openings in the conduit block connecting to the primary fluid flow path. A pair of metallic pieces, then, are press-fit into these openings. Such pieces are bored with small-diameter openings, through the middle, for the small-diameter sensor tube end, either input or output. Such metallic pieces, which are generally circular, cylindrical in shape, can have, e.g., circular edges formed on the face toward the conduit block. Then, washer-like elements, having cooperating circular edges, to form a fluid-tight seal can be squeezed between the interface mounting block and the conduit block, about the sensor tube near the ends of such tube. The metallic interface pieces can have a built-up configuration along those same faces to provide a convenient form for welding the sensor pipe, at the ends of the pipe, to the pieces. The particularities of the interface structures, and the use of space by the interface mounting block, as examples, are noteworthy considerations.

Where, with respect to mass flow controllers, there has been a desire to use heat mechanisms, rather than piezo-electric or solenoid mechanisms, to control flow through the flow controller valve, the need for significant force has typically been a requirement. In accordance with this, the use of electrical heating of a wire, to in turn heat a surrounding tube, has been the subject of past effort and development. The mass of the tube, in expanding with the application of heat or contracting with the removal of heat, can then be the source of the required amount of force, while also a source of slowness in the response time.

The present invention is directed to ease and efficiency of operation, as well as ease and efficiency of construction, in relation to a number of areas. These include the mechanics of valve operation, the directional aspects of the primary path fluid flow, the restriction of primary path fluid flow in relation to a sensor fluid path, the mounting of the sensor housing and the related interface between the sensor fluid path and the primary fluid path, and the mounting of the valve seat in the primary fluid flow path.

SUMMARY OF THE INVENTION

In accordance with valve mechanics aspects of the invention, a fluid flow controller having a sensor to measure fluid flow and an actuator to respond to the sensor, is provided. The fluid flow controller includes input pipe structure, intermediate pipe structure, and output pipe structure. It also includes a valve seat mounted in the intermediate pipe structure, a valve gate member associated with the valve seat, and a gate-member controller. The input pipe structure defines an inlet for receiving a fluid having a flow, and defines a fluid flow opening through the structure. The intermediate pipe structure receives the fluid downstream from the input pipe structure and defines a fluid flow opening through such structure. And the output type structure receives the fluid downstream from the intermediate pipe structure and similarly defines a fluid flow opening through such structure. The gate-member controller includes a controller rod structure and a mounting structure. The controller rod structure has a gate-member contacting portion, a mounting portion and an actuation portion. The controller rod structure is connected to the mounting structure along the controller rod structure mounting portion; and the actuation and gate-member contacting portions of the rod structure are movable in opposing directions with reference to the position of the mounting structure, in response to the flow controller actuator, to adjust the fluid flow.

The controller rod structure is substantially pivotally mounted, and the mounting structure stretches and unstretches as the actuation and gate-member contacting portions of the controller rod structure move in the opposing directions. The mounting structure includes a metallic diaphragm, which has a substantially unbent form and a substantially circular shape.

The mounting portion of the controller rod structure includes a section on the actuation portion side of the mounting structure and another section on the gate-member contacting side of the mounting structure, which are substantially cylindrically-shaped and which have differential strengths against bending in order to favor bending along one of the sections over the other of the sections.

The valve seat which is mounted in the intermediate pipe structure defines a fluid flow opening that is substantially aligned with the fluid flow openings through the input and output pipe structures.

In accordance with valve actuator and valve controller aspects of the invention, an actuator and controller mechanism for the gate-member of a fluid flow control valve includes a gate-member controller rod structure having an actuation portion and a gate-member contacting portion, a heat-sensitive actuator wire structure, and actuator control circuitry to control the temperature of the actuator wire structure. The actuator wire structure is connected to the actuation portion of the controller rod structure. It expands and contracts in response to changes in its temperature, and moves the gate member contacting portion of the rod structure in order to adjust the fluid flow through the valve substantially solely in response to such expansion and contraction.

One tubular structure, disposed about the wire structure and extending to one side of the actuation portion of the controller rod structure, is fixed to the wire structure and is also substantially non-movable with the expansion and contraction of the wire structure. Another tubular structure, disposed about the wire structure and extending to the other side of the actuation portion of the controller rod structure, is fixed to the controller rod structure and also to the wire structure in order to move the actuation portion of the controller rod structure in response to the expansion and contraction of the wire structure. A spring is mounted to act against the controller rod structure.

In accordance with primary and sensor fluid flow path aspects of the invention, a fluid flow meter includes pipe structure having an inlet and an outlet for fluid having a flow rate to be measured, and a tapered main fluid flow path opening through such structure. It also includes a flow restrictor lodged in such opening to generate a fluid pressure drop along the opening, and a fluid flow sensor which incorporates a sensor conduit having a sensor fluid flow path opening in parallel with the main fluid flow path opening and having inlet and outlet openings positioned to provide a sensor conduit fluid flow responsive to the pressure drop. The flow restrictor includes a core structure and lengths of wire structure disposed along the core structure between the core structure and the pipe structure.

The lengths of wire structure are deformed between the core structure and the pipe structure. The core structure, for example, may include spherically-shaped structure or conically-shaped structure, and, as further examples of a variety of choices, may include three or four lengths of wire structure.

In accordance with other primary and sensor fluid flow path aspects of the invention, a fluid flow meter includes a fluid flow sensor incorporating a fluid flow sensor conduit having an inlet and an outlet and having a sensor fluid flow path opening through the conduit, pipe structure having an inlet and an outlet for fluid having a flow rate to be measured, and having a main fluid flow path opening in parallel with the Sensor fluid flow path opening. The pipe structure also has a sensor conduit inlet opening for the inlet end of the sensor conduit and a sensor conduit outlet opening for the outlet end of the sensor conduit. An inlet metallic sealer structure extends into the sensor conduit inlet opening and an outlet metallic sealer structure extends into the sensor conduit outlet opening. Each of the sealer structures is rounded along the direction through the sensor conduit opening into which it extends, and each itself has an opening through the sealer structure for the associated end of the sensor conduit.

Each of the inlet and outlet sealer structures includes a spherically-shaped surface portion extending in the associated sensor conduit opening of the pipe structure, and each also includes a flat surface portion. And, the sensor .conduit is attached to each of the sealer structures.

The pipe structure may have a pair of inlet corners near its sensor conduit inlet opening and a pair of outlet corners near its sensor conduit outlet opening; and an inlet washer structure may then be bent between the inlet sealer structure and such inlet corners while an outlet washer structure is bent between the outlet sealer structure and such outlet corners.

In accordance with valve seat mounting aspects of the invention, a method of mounting a valve seat in a pipe structure is provided. A valve seat bushing is provided having an opening through the bushing for fluid flow and having one end surface transverse to the direction through the bushing and another end surface, with the valve seat mounted near such other end surface. The bushing is inserted in the pipe structure and movement of the bushing is blocked in a direction through the bushing. A structure is placed against the first end surface and a force is applied to the structure to deform that end surface, to push the outer wall surface of the bushing against the inner wall surface of the pipe structure, and to fix the bushing in the pipe structure.

The transverse, first end surface has a shape including a conical shape prior to the deforming action and a shape including a spherical shape after such deforming. The structure that is placed against such end surface during the deforming, includes a spherical shape. In the blocking of movement by the bushing, a surface of the bushing between the end surfaces is abutted against an anvil structure.

BRIEF DESCRIPTION OF THE DRAWINGS

FIG. 16 is an alternative embodiment for various of the valve control and actuator parts shown in FIG. 2, FIG. 16 being a normally-open valve embodiment and FIG. 2 being a normally-closed valve embodiment.

FIG. 17 is a perspective view of an alternative embodiment for the flow restrictor of FIG. 7.

FIG. 18 is a perspective view, partially broken-away, showing a part of the flow-restrictor of FIG. 18.

FIG. 19 is a cross-sectional view of the flow restrictor of FIG. 17 in position in the primary fluid flow path, comparable to the view of FIG. 6.

FIG. 20 is a cross-sectional view, broken-away, showing an alternative embodiment for the connection between the sensor conduit and the primary fluid flow path, comparable to the view of FIG. 10.

DETAILED DESCRIPTION

Figure 1:
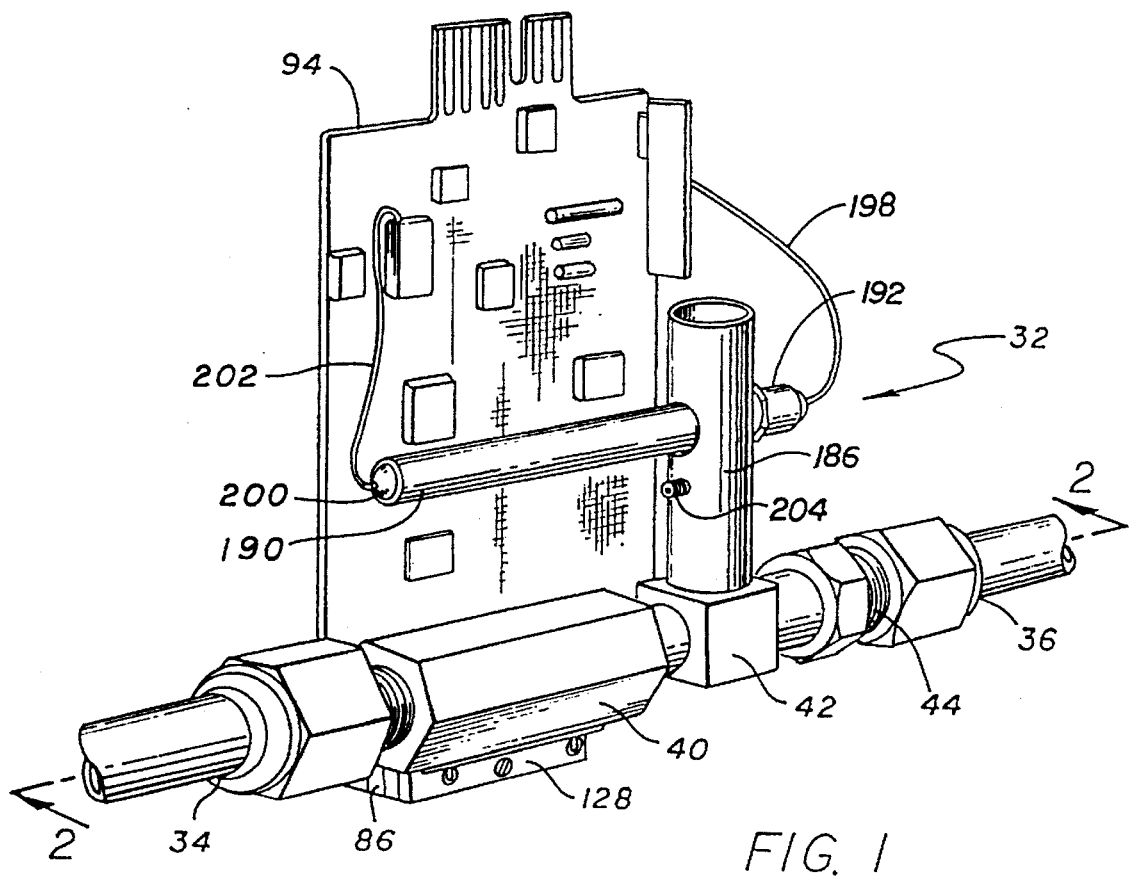
FIG. 1 is a perspective view of a flow controller in accordance with the invention, with fluid flow connections into and out of the controller.
Figure 2:
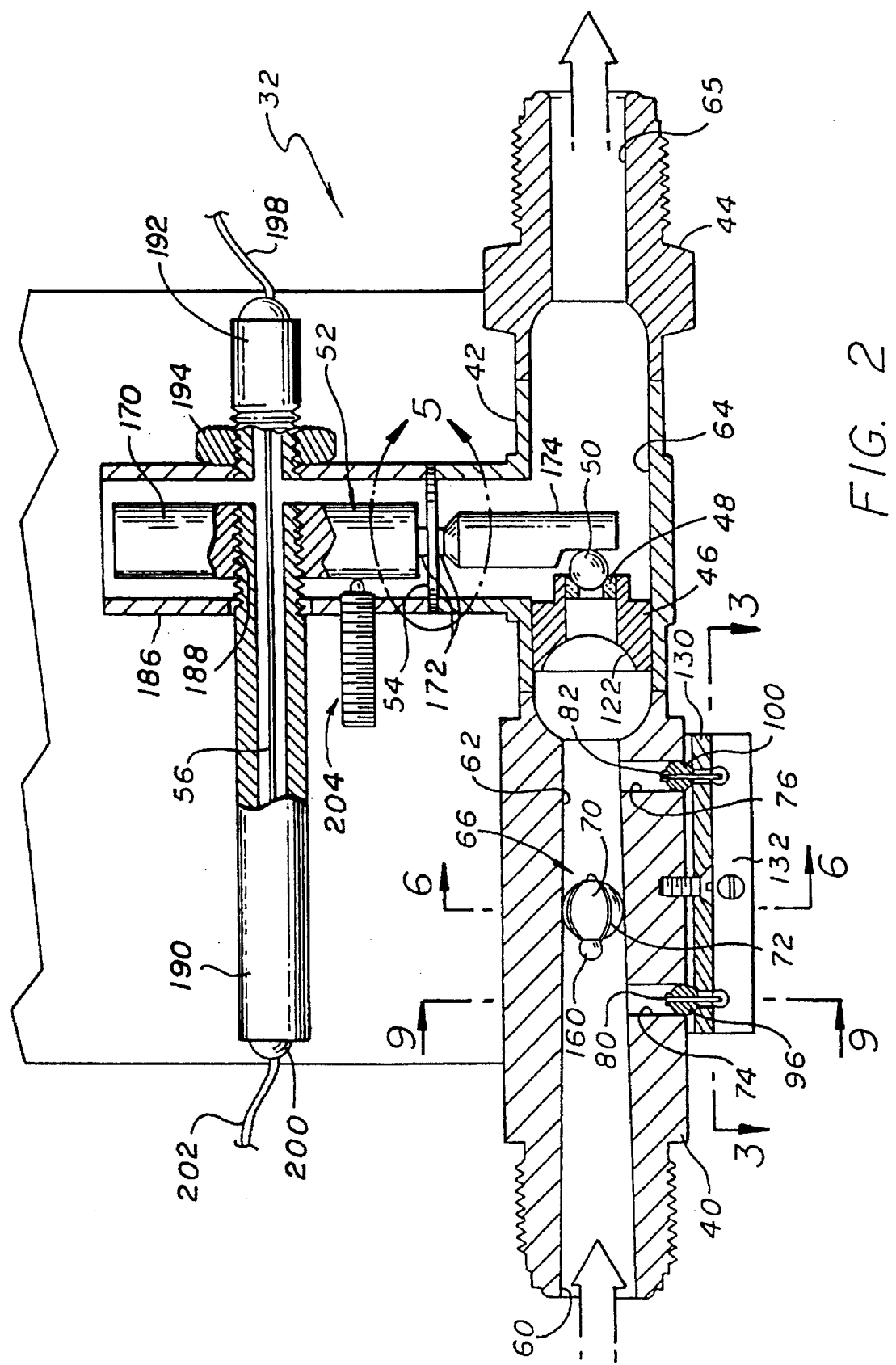
FIG. 2 is a cross-sectional view of the flow controller of FIG. 1 taken along the line 2—2 of FIG. 1.

By way of introduction and summary, there is shown in FIG. 1 a mass flow controller 32 with input side 34 and output side 36 connections to a fluid flow system. As shown in FIGS. 1 and 2, the flow controller has an input pipe section 40, an intermediate pipe section 42 and an output pipe section 44. As shown in FIG. 2, a valve seat bushing 46, having a valve seat 48 press-fit in the bushing, is mounted in the intermediate pipe section 42. And a ball 50 acts as the gate-member for the valve, in association with the valve seat, to adjust the fluid flow through the valve.

Figure 4:
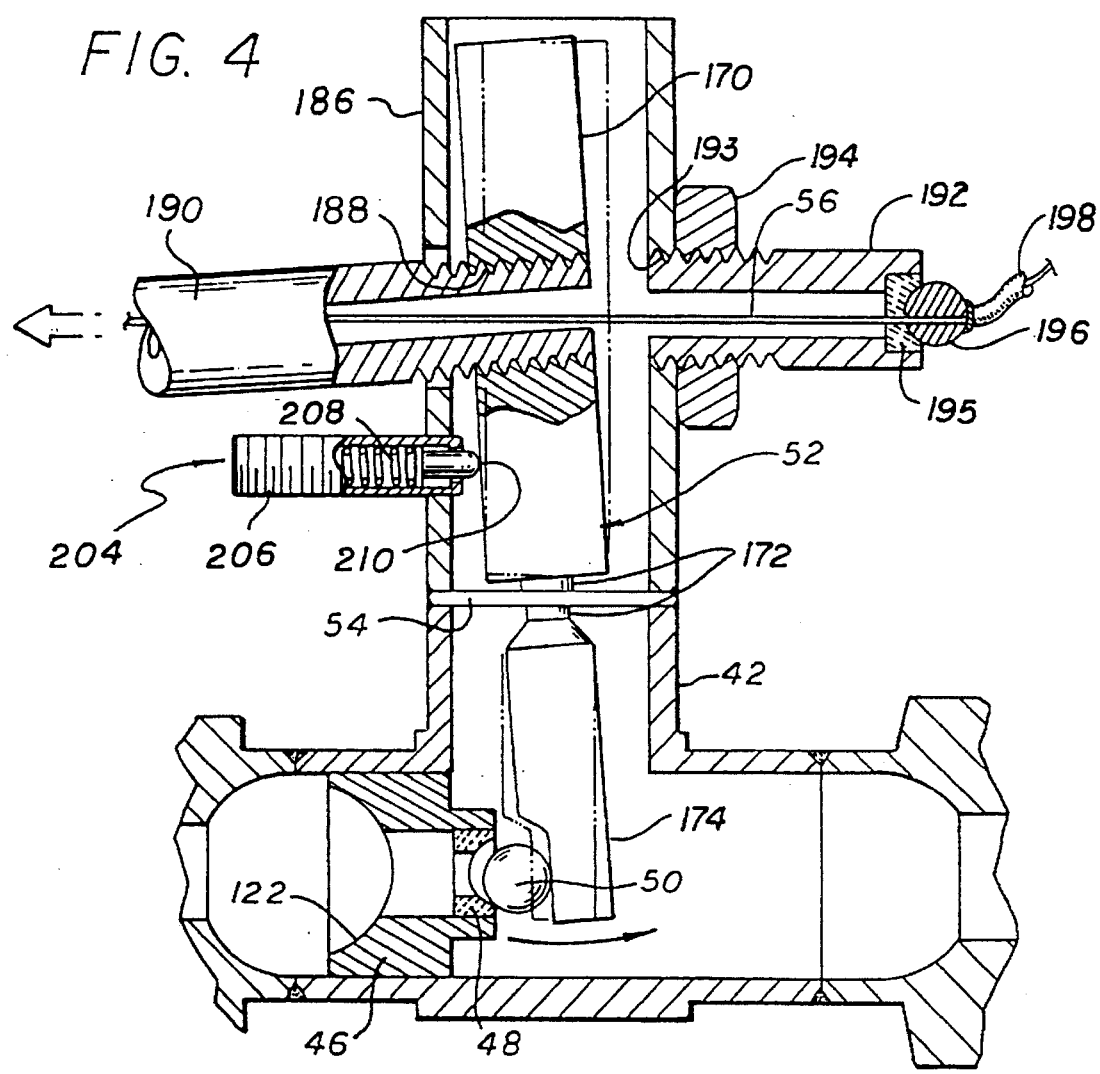
FIG. 4 is a cross-sectional view, enlarged and partially broken-away, showing various valve control and actuator parts of FIG. 2.
Figure 5:
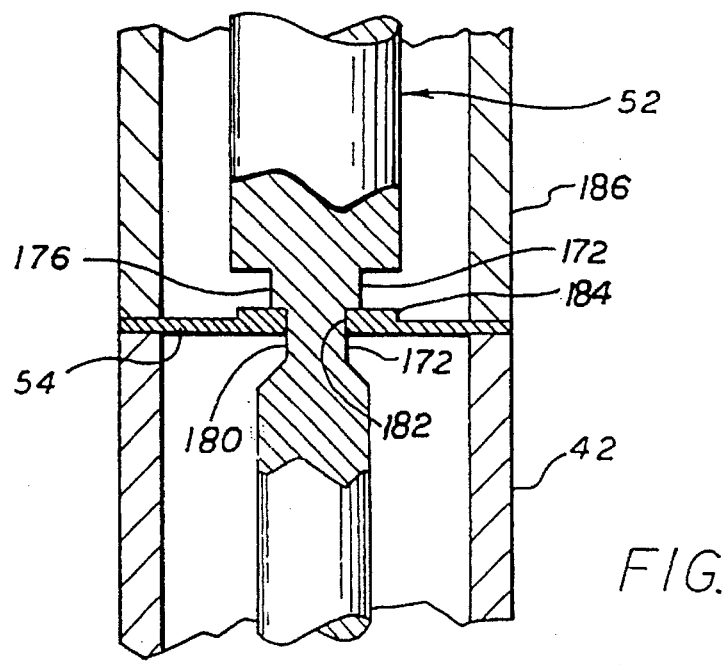
FIG. 5 is a cross-sectional view, enlarged and broken-away, further showing various valve control parts of FIG. 2.

As shown, for example, in FIGS. 2 and 5, the position of the gate-member ball 50 is controlled by a controller rod 52 which is substantially pivotally mounted on a metallic diaphragm 54. The adjustment of the position of the controller rod 52 in turn is accomplished through the expansion and contraction of an actuator wire 56 having a temperature which is changed in accordance with the desired fluid flow (see also, for example, FIG. 4).

Still referring to FIG. 2, the input pipe section 40 of the flow controller 32 has a fluid inlet 60 and an input section fluid flow opening 62 through the section. Similarly, the intermediate pipe section has an intermediate section fluid flow opening 64. And the output pipe section 44 has an output section fluid flow opening 65.

Figure 6:
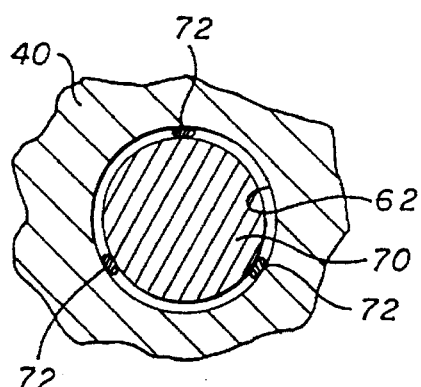
FIG. 6 is a cross-sectional view, enlarged and partially broken-away, taken along the line 6—6 of FIG. 2, showing the fit of the flow restrictor in the primary fluid flow path.
Figure 8:
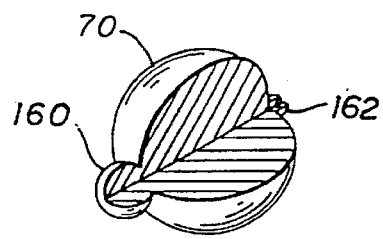
FIG. 8 is a perspective view, partially broken-away, of a part of the flow restrictor.
Figure 7:
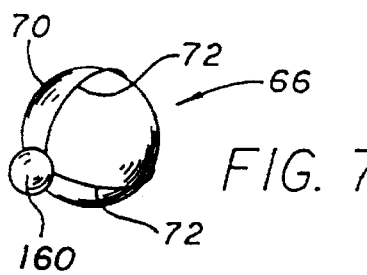
FIG. 7 is a perspective view of the flow restrictor.

In the input section fluid flow opening 62, a spherical form flow restrictor 66 is tightly lodged (see also FIG. 6). As shown in FIGS. 2, 7 and 8, the flow restrictor has a core 70 and lengths of wire 72 disposed along the core which, with the restrictor in position, are squeezed between the inside wall of the input pipe section 40 and the core.

The flow restrictor 66, of course, creates a pressure drop across the restrictor. As shown in FIG. 2, an inlet sensor conduit opening 74, transverse to the input section fluid flow opening 62, is provided through the input pipe section to the upstream side of the flow restrictor 66. Similarly, to the downstream side of the flow restrictor, there is provided an associated transverse sensor conduit outlet opening 76 through the input pipe section.

In FIG. 2 it can be seen that the inlet end 80 of the sensor conduit communicates with this inlet opening 74 and the outlet end 82 of the sensor conduit communicates with the outlet opening 76. The arrangement at the input end 80 is shown enlarged in FIG. 9, with the arrangement at the outlet end 82, of course, having a like appearance.

Figure 3:
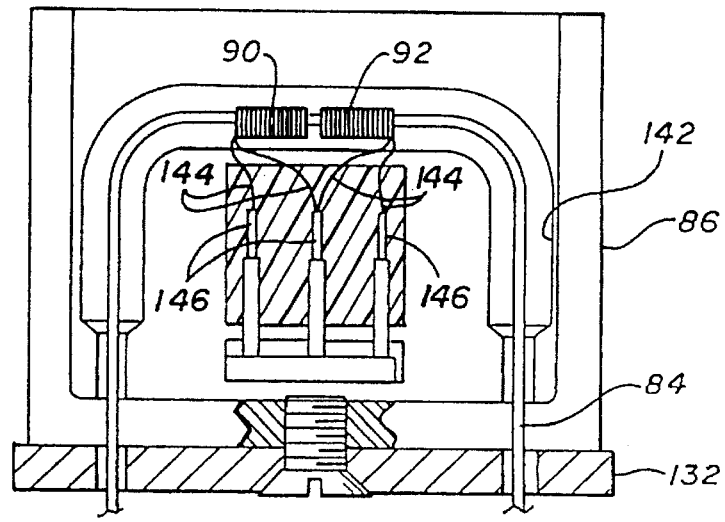
FIG. 3 is a cross-sectional view taken along the line 3—3 of FIG. 1, showing various parts of the sensor of the flow controller.

The main body of the sensor conduit 84 is shown, disposed in a sensor housing 86, in FIG. 3. As shown in FIG. 3, the mass flow sensor is of the well-known type which uses the effect of the gas flow through the sensor conduit, on upstream 90 and downstream 92 temperature-sensitive resistance wire coils, to measure the fluid flow through the sensor conduit, which for the fluid flow range of concern, will be essentially a fixed ratio of the fluid flow through the primary fluid flow path.

Figure 11:
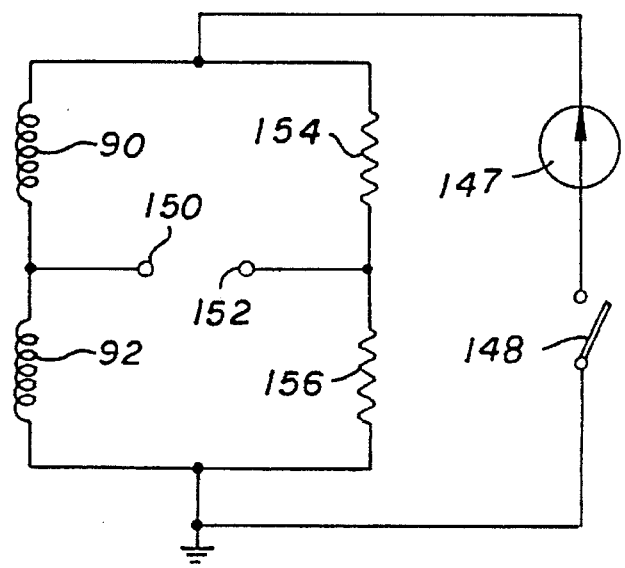
FIG. 11 is a schematic view, showing the coils of the sensor of FIG. 1 in an illustrative bridge-type measurement circuit.
Figure 12:
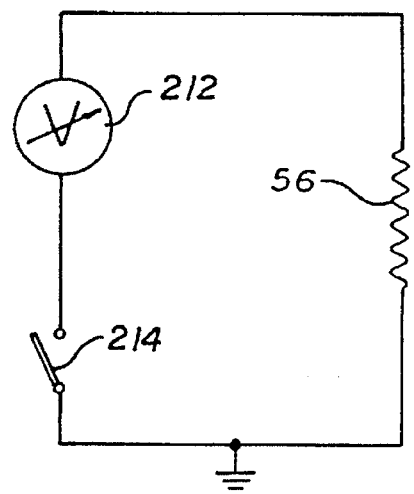
FIG. 12 is a schematic view, showing the actuator wire of the flow controller, as a resistor, in an illustrative temperature-variation circuit.

The bridge-type circuit of FIG. 11, with the upstream 90 and downstream 92 sensor coils as circuit elements, illustrates electronic sensor circuitry providing an output voltage representative of the mass fluid flow rate. As shown in FIG. 1, a printed circuit board 94 provided with various electronic components incorporates the required sensor circuitry. It also incorporates actuator circuitry to change the temperature of the actuator wire 56, as schematically illustrated in FIG. 12, along with other conventional circuit elements which may interact with the electronic sensor and actuator elements and/or which may be required for the flow controller 32 to interact with external electronics.

As already adverted to, like metallic sealer members are used in providing the communication between the inlet 80 and outlet 82 ends of the sensor conduit 84, and the sensor conduit inlet 74 and outlet 76 openings. Beyond FIG. 9, referred to above, this is shown in FIG. 10, where the inlet sealer member 96 is in position in the inlet opening 74. As can be seen, this sealer member has a spherically-shaped surface portion 100. The like outlet sealer member 98, of course, appears in FIG. 2.

Figures 14, 15:
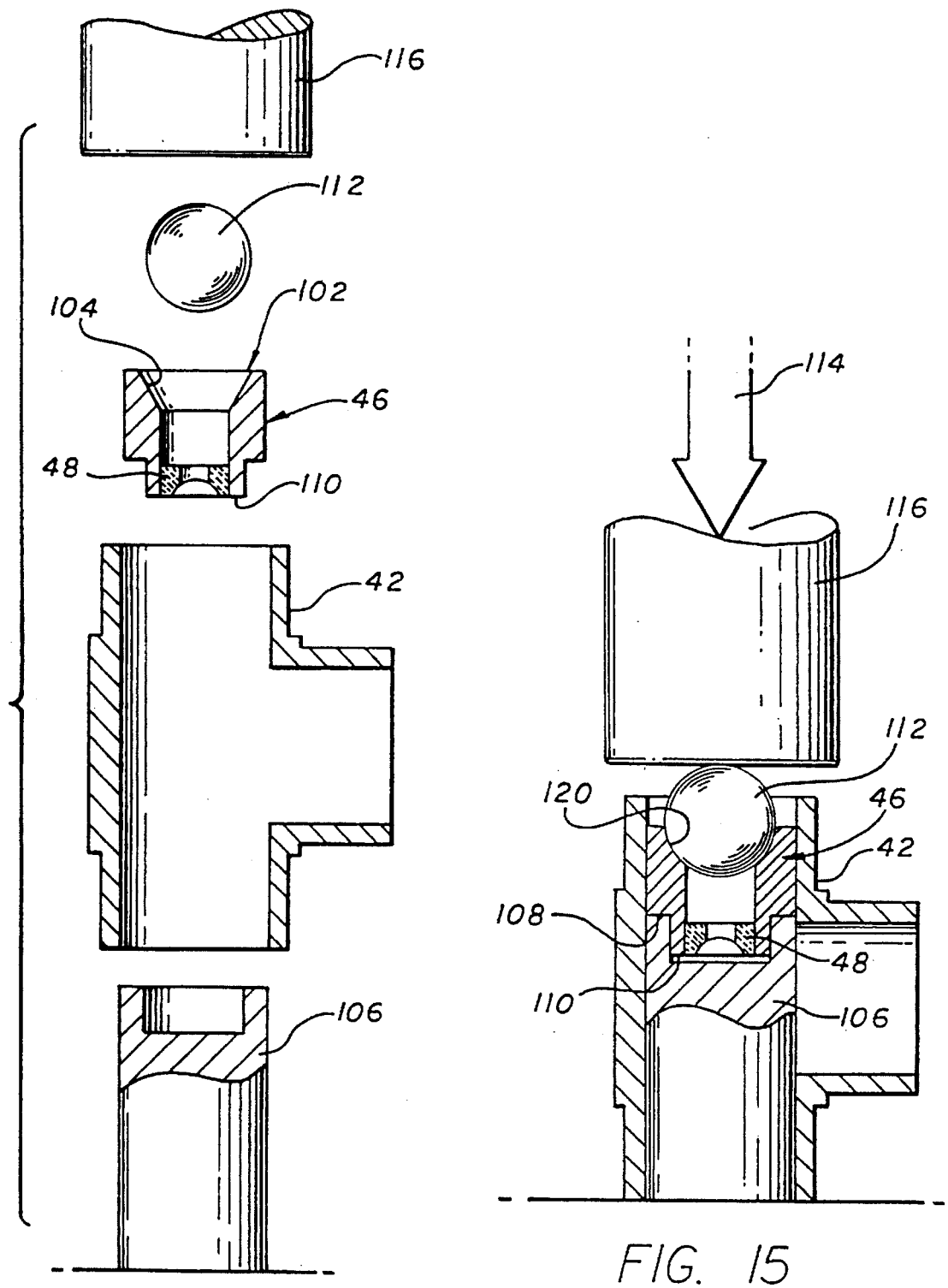
FIGS. 14 and 15 illustrate the mounting of the valve seat of the flow controller of FIG. 1 in position in the controller.

In mounting the valve seat bushing 46 in the intermediate pipe section 42, for purposes of gas flow efficiency and purity in the fluid flow path, the avoidance of scratching along the inner wall surface of the pipe section is of significance. The mounted bushing, having the valve seat 48 press-fit in the bushing, can be seen, for example, in FIG. 2. The mounting process, to avoid the scratching, is depicted in FIGS. 14 and 15. It can be termed a radial expansion-fit process. Specifically, before the mounting, the valve seat bushing 46 has an upstream end surface 102, transverse to the direction through the bushing, which has a shape including a conical shape. In particular, there is a conically-shaped end surface portion 104. In mounting the bushing 46, the bushing is inserted in the intermediate pipe section 42 against an anvil 106. With the anvil abutting an annular-shaped surface 108 of the bushing, which is formed between the upstream end surface 102 and a downstream end surface 110, a deformation ball 112 is positioned against the conically-shaped surface portion 104 of the upstream end surface and subjected to a deformation force, represented by the arrow 114, applied through a deformation implement represented at 116. As shown in FIG. 15, this results in the deformation of the conically-shaped surface portion to a spherically-shaped surface portion. This surface portion, during the deformation process, is represented at 120 in FIG. 15. The end-result, spherical surface portion 122, with the bushing 46, in position, can be seen, for example, in FIG. 2. The application of the force and the deformation, of course, brings with it a force along the outside wall of the bushing against the inside wall of the intermediate pipe section 42. The stretching and deformation associated with this results in a tight and stable fit for the bushing in the pipe section, accomplished by radial expansion.

The mass fluid flow controller 32, of course, is particularly adapted to controlling the flow of a gaseous fluid. And as indicated, for maintaining an essentially fixed ratio of the diverted fluid flow through the sensor conduit 84 to the undiverted fluid flow through the primary fluid flow path, the restrictor should maintain a smooth fluid flow along such restrictor. This typically means a laminar-type fluid flow along the restrictor. In regard to this, the spherical form flow restrictor 66, as shown in FIGS. 2 and 6 through 8, is particularly adapted for flow rates in a relatively low range. On the other hand, a conical form flow restrictor 124, shown in FIG. 17, is particularly adapted for a higher range of fluid flow rates. In the particular embodiment of FIG. 17, the taper angle of the conically-shaped (frusto-conical) core 126 is the same as the taper for the input section fluid flow opening 62 (FIG. 2).

Figure 9:
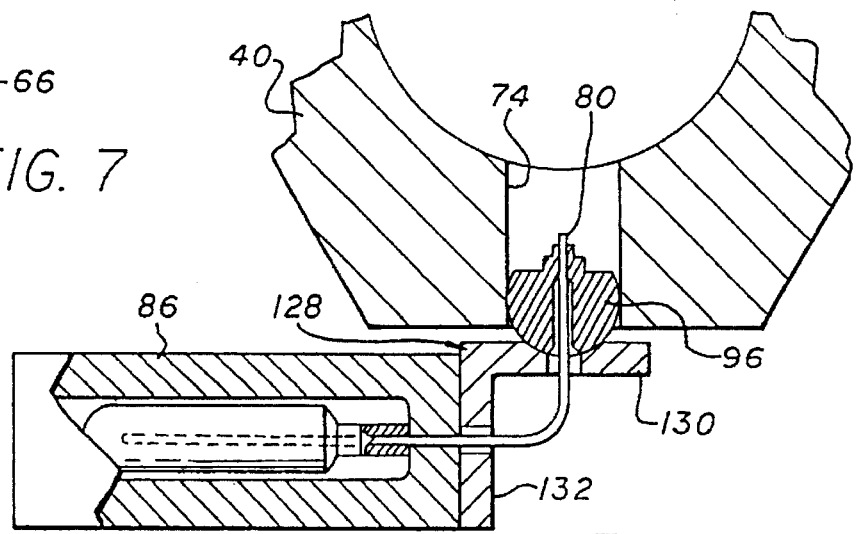
FIG. 9 is a cross-sectional view, enlarged and partially broken-away, taken along the line 9—9 of FIG. 2, showing the connection between the sensor conduit and primary fluid flow path including the sealer structure for the connection.
Figure 10:
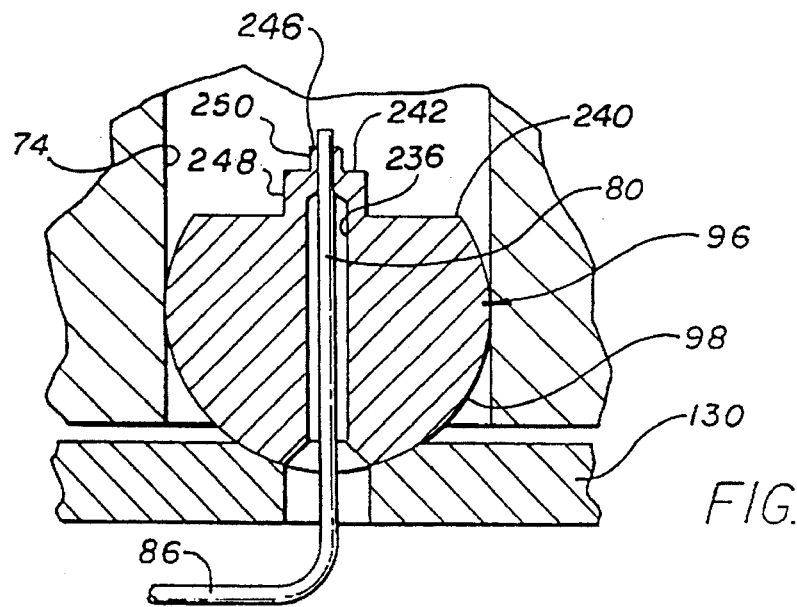
FIG. 10 is an enlarged view, broken-away, showing some of the parts of FIG. 9, including the sealer structure.

In the flow controller 32, the sensor housing 86 is conveniently mounted on an L-shaped bracket 128 having a leg 130 along the input pipe section 40 and a leg 132 under the sensor housing (see, for example, FIGS. 1, 2 and 9). This pipe-section leg 128 is mounted tightly against the sealer structures 96 and 100, as shown in FIGS. 1 and 10. However, in the flow controller 32, this tight fit in fact is not necessary to hold the sealer structures in position. The press-fit, in connection with the sealer structure shapes involved, provides a tight and stable fit without additional force from the bracket leg 128. Nevertheless, the tight fit of the bracket leg is convenient for other assembly and stability reasons.

On the other hand, in a modification illustrated in FIG. 20, which is comparable to the view of FIG. 10, sealer members which are the same as the inlet and outlet sealer members 96 and 100 of FIGS. 2 and 10, are used in a fashion which requires the holding force of the leg 128 of the L-shaped bracket which is along the input pipe section. Such an inlet sealer member 134 is shown in FIG. 20 squeezed against an inlet washer member 136 which, due to the force, is bent around a pair of inlet corners 140 at the entrance to the sensor conduit inlet opening 74 for the sealer member.

The valve controller and actuator arrangement of the flow controller 36 of FIG. 1, as shown in FIGS. 2 and 4, provides for a normally-closed operation of the valve. An alternative arrangement, shown in FIG. 16, provides a normally-open alternative.

The above introductory and summary description, in connection with the drawings, of course, does provide a substantial amount of detail about the flow controller 32, its parts and operation, and variations in such parts and operation.

As for additional detailed aspects, the mass flow sensor, which among other parts includes the sensor housing 86, the sensor conduit 84, e.g. as shown in FIG. 3, and sensor electrical circuitry as schematically illustrated in FIG. 11, is of the general type that is the subject of U.S. Pat. No. 5,191,793, entitled Fluid Mass Flow Meter Device With Reduced Attitude Sensitivity. That patent, which issued Mar. 9, 1993 and which is assigned to the same assignee as herein, is incorporated herein by reference.

As essentially explained in such patent, the housing 86 is a metallic housing which has an opening 142 through the housing for the sensor conduit 84 and for the upstream 90 and downstream 92 coils about the conduit. The housing is formed of two pieces, the body which can be seen in FIG. 3, and a cover for the body, formed to press-fit into position.

Four leads 144 from the sensor coils 90 and 92 are connected to connector leads 146 in the housing, to electrically connect the coils into the sensor circuitry, as shown in FIG. 11. As for the exemplary electrical circuit of FIG. 11, the coils 90 and 92 are connected in this bridge-type circuit. The operation of this and a variety of other bridge-type circuits is well-known to and understood by those knowledgeable in the art. A.D.C. current source 147, after a switch 148 is closed, with no gas flowing through the sensor conduit, establishes a base output voltage between two output terminals 150 and 152 of the circuit. The current through the coils 90 and 92 heats the wires of the coils to equal levels, establishing the same temperature in the two coils. With the two bridge resistors 154 and 156 having equal resistances, the base output voltage, then, of course, is zero and the bridge-type circuit is balanced.

With gas flow, however, the upstream sensor coil 90 is cooled by the gas flow, giving up some of its heat to the gas flowing by, and the downstream sensor coil 92 is heated, taking some of the heat that was given to the gas. Therefore, a temperature differential is established between the coils 90 and 92, resulting in a voltage across the output terminals 150 and 152. This voltage, of course, is due to the change in resistance of the coils with temperature.

The temperature difference between the coils, within the range of the device, is a measure of the number of gas molecules, and thus of the mass of the gas flowing through the conduit. The difference in the resistance of the coils, similarly, is a measure of the difference in temperature between the coils. With the output voltage determined by this difference in resistance, the output voltage then becomes a measure of the mass flow rate of the gas.

To provide an output voltage which is proportional to the difference between the resistances of the coils, the two bridge resistors 154 and 156 should have much larger resistances than the resistances of the coils. Further, to make the bridge circuit accurate at a wide variety of temperatures, the current source 146 and the bridge resistors should incorporate temperature independence for the variety of temperatures.

As indicated, bridge-type circuits, including variations to implement independence of various environmental conditions, are well known and well understood. There, of course, is a concern here for coil material for the circuit having a resistance which is proportional to temperature and for coils, of this material, providing temperature differences which are proportional to mass flow rate. In this regard, typically, well outside the range of the sensor, the flow of the gas will become sufficiently fast to cool both the upstream 90 and the downstream 92 coils.

Although the above description, and the incorporated patent, provide substantial detail with regard to the sensor. The details of the sensor itself and its operation, do not form part of the invention.

Turning to the fluid flow restriction in the input section fluid flow opening 62, with the spherical form flow restrictor 66 in position providing a pressure drop, a ratio between the mass flow rate through the sensor conduit 84 and through the primary fluid flow path, which includes the input section fluid flow opening, is established. This general technique is well known and well understood. In accordance with this general technique, the restrictor should be such that the pressure drop versus fluid flow characteristics in the primary fluid flow path and in the sensor conduit are comparable. In large part, this typically means maintaining a laminar-type flow in the primary fluid flow path along the restrictor, and also in the sensor conduit (as opposed to a turbulent flow).

The spherical form flow restrictor 66 is adapted to satisfy these requirements and, also, within a range, a desire to be able to vary the fluid flow ratio that is established between two paths. And it is adapted to accomplish this in a convenient and efficient manner.

Specifically, the restrictor core 70 can be formed from a ball-bearing structure, for example of a stainless steel material which carries the generic designation 316 stainless steel. Such ball-bearing structures are mass produced to high quality tolerances. Then a similarly-shaped restrictor handle 160, e.g., of the same material, can be welded to the upstream end of the core and a small nub 162, e.g., of the same material, can be welded to the downstream end. Of course, the core, handle and nub can also be formed as a single, integral unit or attached in ways other than by welding. The handle can then be used as a way to hold the restrictor with an implement and force it into the input pipe section fluid flow opening 62, or as a part that can be tapped with an implement to force the restrictor into position. The handle and the nub together are also used in placing the wire in position to provide the three lengths of wire 72 along the core 70. For example, a sufficiently long length of wire can be used, wrapping it around the junction of the handle 160 and the core 70 and welding it to the nub 162 several times and also to the just-mentioned junction area, for example, one time. Of course, however, a number of alternatives to accomplish the desired wire arrangement are readily apparent. Also, the number of lengths of wire can be as low as one or as large as is desired and practical.

The input section fluid flow opening 62 is tapered, from larger to smaller, starting at the inlet 60 (FIG. 2). A taper of 1 degree would be a typical example, although a variety of alternatives can be adopted depending upon the particular requirements involved. The result of the taper, of course, is that as the flow restrictor 66 is inserted further into the tapered opening, beyond the point of initial contact between the lengths of wire 72 and the inner wall of the opening, the fit gets tighter and tighter, and the lengths of wire become more and more squeezed along portions of such lengths. Such squeezing, of course, causes greater and greater elongation of the cross-section of the wire where it is squeezed between the core 70 and the wall of the opening, as shown in FIG. 6. Apart from such elongation from squeezing, the cross-section, of course, is circular. The change, caused by the closer fit of the core 70 as the restrictor is pushed inwardly, and by the change in the cross-section of the wire, of course, affects the fluid flow characteristics in the vicinity of the sensor conduit 84. There, thus, is an effect on the ratio of the fluid flow in the sensor conduit to the fluid flow in the input section opening 62 and, thus, in the primary flow path of which that opening is a part. Therefore, the pushing of the flow restrictor inwardly or pulling outwardly can, to some degree, be used as a mechanism to adjust this ratio and the calibration of the sensor voltage across the terminals 150 and 152 (FIG. 11), versus fluid flow, within a range. And the taper of the opening, the size of the core versus the opening, and the diameter of the wire can be varied to affect this capability and its range. In this respect, however, wire, e.g. of 316 stainless steel, having a diameter of 0.006, is considered convenient and efficient for the spherical form flow restrictor 66.

In FIG. 19, the alternative conical form flow restrictor 124 is shown in position, as a replacement for the spherical-form flow restrictor 66. In the perspective view of the conical form flow restrictor of FIG. 17, and in the view of the core alone in FIG. 18, there is a significant enlargement. Thus, the length of the particular core 126 shown is such that it would readily fit in the space between the sensor conduit inlet 74 and outlet 76 openings of the input pipe structure 40. However, this need not be the case. In accordance, with variations, the core can be longer than the distance between the inlet and outlet openings and extend beyond one or both such openings. Analogously to the cross section of FIG. 6, the cross-section with the conical form flow restrictor of FIG. 19, is at a point where the lengths of wire along the core 126 are squeezed between the core and the inner wall of the input pipe structure.

As shown in FIGS. 17 and 18, the conical form flow restrictor 124 has a handle 164 and a nub 166 which serve the analogous purposes to the analogous structures for the spherical form flow restrictor 66. As an example, the conical form restrictor is shown having four lengths of wire 168 which can be mounted, using the handle and the nub, in a fashion analogous to that explained for the spherical form flow restrictor, but modified for four lengths of wire rather than three. Conveniently, the taper of the conical form core 126 can be the same as for the input pipe section opening 62, for example 1 degree. Or to provide different capabilities, the taper of the flow restrictor could be different. In any case, in a fashion analogous to that explained for the spherical form restrictor, the conical form flow restrictor can be used in setting the fluid flow ratio between the sensor conduit 84 and the input pipe section fluid flow opening 62, and, thus, in setting the calibration of the sensor voltage across the terminals 150 and 152 (FIG. 11). As with the spherical form flow restrictor, the handle 164 can be held by an implement, or tapped by an implement, in inserting or removing the conical form flow restrictor in position. With the conical form flow restrictor, wire, e.g., of 316 stainless steel, having a diameter of 0.006 inch or 0.0012 inch is considered convenient and efficient. Also, again here, the number of lengths of wire can be as low as one, or as large as desired and practical.

The spherical form flow restrictor 66 is adapted for a relatively low mass fluid flow range, for example, up to, typically, about 500 standard cubic centimeters/minute. Depending upon variations, however, this might be lower, for example, up to only about 200 standard cubic centimeters/minute or higher, for example, up to about 800 standard cubic centimeters/minute. On the other hand, the conical form flow restrictor is particularly adapted to an intermediate mass fluid flow range, for example, from the upper limit of the spherical form flow restrictor to an upper limit in the range of from about 2500 standard cubic centimeters/minute to about 5000 standard cubic centimeters/minute, depending on various design choices.

Where mass fluid flow rates above these relatively low and intermediate ranges are a concern, a form or forms, conventionally implemented, in accordance with the ordinary skill in the art, appropriate to such higher rates, can readily be employed.

Turning to the actuator and controller mechanism for the valve gate member 50, the mechanical parts for the normally-closed valve mechanism, of the flow controller 32, is best shown in FIGS. 1, 2, 4 and 5. Referring to such figures, the controller rod 52 has an actuation portion 170, a mounting portion 172 and a gate-member contacting portion 174. The details surrounding the actuation portion, although generally apparent from the drawings, will be explained in more detail below. For present purposes, it should be observed that the actuation portion of the controller rod pivots counter-clockwise with an increase in the temperature of the actuator wire and the resulting expansion of the wire. On the other hand, the pivoting is clockwise with the contraction of the wire resulting from a cooling of the wire.

Such pivoting, then, is essentially solely in response to such expansion and contraction. In this respect, the valve is a completely thermally-operated valve. Also, that substantially only the wire alone need expand or constrict is of significance. Such wire, of course, has a low mass, and thus can be heated and cooled more rapidly than larger masses. This low mass aspect makes for a relatively fast response time. If a mass 10 or 100 times greater were involved, the response time could typically be 10 or 100 times slower.

With the counter-clockwise or clockwise movement of the actuation portion 170 of the controller rod 52, the gate-member contacting portion 174 similarly moves counter-clockwise or clockwise. As can be seen, the counter-clockwise movement tends to adjust the gate-member ball 50 to a more open position, permitting an increase in fluid flow rate. The clockwise movement tends to position the gate-member ball in a more closed position, decreasing the fluid flow rate. The totally-closed, rest position is shown in FIG. 2 and in the broken lines of FIG. 4. A somewhat open position is shown in the continuous lines of FIG. 4.

The controller rod 52, along its mounting portion 172, is attached to the metallic diaphragm 54 in order to mount the controller rod. This metallic diaphragm has a generally circular shape. It also does not have a bent form, such as a corrugated form. It stretches and unstretches so as to provide a substantially pivotal mounting for the counter-clockwise and clockwise movement of the controller rod to adjust the fluid flow.

Along the mounting portion 172 of the controller rod 52, there is a circular, cylindrically-shaped section 176 of the mounting portion, which extends to the actuation portion side of the diaphragm 54; and there is another circular, cylindrically-shaped section 180 disposed in the mounting opening 182 through the diaphragm, which extends to the gate-member side of the diaphragm. As can best be seen in FIG. 5, the former of these sections has a larger diameter, and thus a greater strength against bending, than the latter of these sections. In connection with this, the diaphragm 54 also is formed with an annular step portion 184 along the actuation side of the diaphragm, extending from the diaphragm opening 182 part of the way outward along the diaphragm. The controller rod 52 and the diaphragm 54 can conveniently and efficiently be made of, e.g., 316 stainless steel, e.g., welded together or attached by brazing.

The cylindrical sections 176 and 180 of the controller rod 52 having different diameters and, thus, having different strengths against bending, serve a particular purpose. When the diaphragm, with the controller rod 52 attached, is, e.g., welded in position between the intermediate pipe structure 42 and a tubular casing 186 for the part of the controller rod above the diaphragm, the position of the controller rod, and particularly the gate-member contacting portion 174, may be slightly off from the position desired for the normally-closed configuration. However, by the proper application of force along various parts of the gate-member contacting portion and/or the actuation portion 170 of the controller rod, the part of the controller rod below the diaphragm can be slightly bent to slightly change its angle with regard to the diaphragm and the remainder of the controller rod.

As can be seen in FIG. 5, the mounting opening 182 through the diaphragm 54 is sized so that in mounting the controller rod 52 on the diaphragm, the shoulder provided by the upper cylindrical section 176 rests against the diaphragm. However, as will be readily apparent to those of ordinary skill in the art, a variety of alternative forms are possible for the controller rod and diaphragm while still incorporating the desired configuration, and results. For example, the controller rod and diaphragm could be integrally formed while having the same outside configuration, including in the vicinity of the diaphragm. Similarly, the diaphragm could be formed without an opening, for example with the step portion extending through the location of the opening. In connection with this, the controller rod could then have two separate pieces, on either side of the diaphragm, which together are regarded as providing a discontinuous rod structure or, which along with a center portion of the diaphragm, provide a rod structure. In this configuration, the lower cylindrical section would have a circular end welded or brazed to the under side of the diaphragm, and the upper circular, cylindrical section would have a lower end similarly welded or brazed to the diaphragm structure. Thus, a variety of readily apparent alternatives exist.

Now turning to the actuator in additional detail, still focusing on the normally-closed valve operation, and referring to FIGS. 1, 2 and 4, the actuator wire 56 passes through a threaded opening 188 through the actuation portion 170 of the controller rod 52. A tube 190, having outward threads at one end, is attached to the actuation portion of the controller rod by screwing these threads into the threaded opening 188. With reference to the direction of fluid flow through the primary fluid flow path, this tube is disposed about the wire structure and, so disposed, extends to the input side of the actuation portion of the controller rod. On the other hand, to the output side of the actuation portion, another tube 192 is similarly disposed along another portion of the wire 56. This output side tube has outside threads which screw into inside threads along an opening 193 along the tubular casing 186 for the portion of the controller rod above the diaphragm 54. This output side tube 192 is also provided with a lock nut 194 tightened against the casing.

At the output end of the output side tube 192, the tube is formed with a receptacle to receive a press-fit washer 195 made of, e.g., a ceramic or mica material, to provide good electrical insulation. This press-fit, although incorporated here, is not necessary as the tension on the wire will maintain the washer in position. The actuator wire 56 passes through an opening existing through an output side metallic contact ball 196. After passing through this opening, the wire is attached to the contact ball by, e.g., welding or soldering. Similarly, an electrical lead is attached to the ball in order to connect this side of the wire 56 into actuator circuitry, as illustrated in FIG. 12. At the input end of the input side tube 190, the configuration is the same, with a like insulating, press-fit washer (not shown), which, however, need not be press-fit, a like metallic contact ball 200, and an analogous lead 202 to connect the other end of the actuator wire 56 into actuator circuitry, as illustrated in FIG. 12.

Again, with reference to the direction of fluid flow, the output end of the actuator wire 56 is fixed to the output side contact ball 196 which is tightly held in position with reference to the output side tube 192. This can be accomplished by the tension in the wire alone. Although not necessary, here, also, the ball is attached to the washer which is in the tube. Since this output side tube is fixed to the casing 186 about the upper part of the controller rod, which is essentially immovable during operation of the flow controller, the position of that end of the wire does not change with the expansion and contraction of the wire. On the other hand, the input side tube 190 is fixed to the movable actuation portion 170 of the controller rod 52. Therefore, with the expansion and contraction of the wire, this end of the wire and its contact ball 200 move, thereby causing the actuation portion of the controller rod to move counter-clockwise for expansion and clockwise for contraction of the wire. In connection with this, of course, and as just somewhat indicated, it will be apparent that the contact balls 196 and 200, in the embodiment shown, are fixed to their respective insulating washers by conventional techniques for fixing metallic structures to, e.g., ceramic or mica materials. In the counter-clockwise or clockwise movement of the actuation and gate-member contacting portions of the controller rod, in accordance with the substantially pivotal mounting, those portions of course move in opposing directions with reference to the position of the diaphragm 54. As also indicated, however, because of the tension in the actuator wire, the fixing of each contact ball to its respective insulating washer is not necessary.

Referring to FIGS. 1, 2 and 4, a spring assembly 204 is included in the actuator mechanism for the valve. This will in fact provide a spring force against the movement of the controller rod 52 in response to the expansion of the actuator wire 56 and a spring force behind the movement permitted by contraction of the wire. Although unnecessary because the wire will be in tension in operation, this can help to smooth the movement and operation. More importantly, in setting the length of the actuator wire during assembly, this spring force can provide a force to act against, facilitating the assembly. Noteworthy in regard to this, during assembly, because of normal variations in exact positioning, the fit of the parts together, the effects of, e.g., welding, and other such factors, it is possible that the normally-closed rest position for the controller rod 52 may not be an exact vertically aligned position. The existence of the spring assembly 204, then, can aid in establishing the desired position during assembly.

As can be seen, the spring assembly 204 is of a conventional type. There is a spring case 206, having outside threads, which can be turned through the inside threads of an opening along the tubular casing 186 which is about the upper portion of the controller rod 52. The actuator spring 208 then pushes on a nose 210 which abuts the actuator portion 170 of the controller rod 52 under the force of the spring. The spring, of course, is caged near the back end of the case. Then, as the spring case 206 is threaded inwardly, the force of the spring against the controller rod is increased. As the spring case is threaded outwardly, the force of the spring, of course, decreases. Thus, the force of the spring can be adjusted to a desired level.

Concerning the wire 56 being in tension, to accomplish this, during assembly, the input side tube 190 is turned counter-clockwise to put the wire in sufficient tension, when cold, to fully close the valve. Then, heating the wire tends to open the valve, with the wire remaining in tension whether the valve is at its maximum open position, fully closed or anywhere in between.

The actuator wire 56 in an actuator circuit, as shown in FIG. 12, electrically acts as a resistor. Wire, of the type required, is conventionally available. Essentially, the requirement is for a length of wire for which a predictable voltage across the wire, or power through the wire, results in a predictable length in regard to expansion and contraction through heating and cooling. Thus, in the exemplary actuator circuit of FIG. 12, the voltage of a variable DC voltage source 212, with the switch 214 closed, for example, may be controlled by the voltage, reflecting mass fluid flow rate, across the terminals 150 and 152 of FIG. 11, together with a command by an operator, reflecting a desired fluid flow level. All of this, of course, is readily, conventionally implemented. Simply for illustrative purposes, in FIG. 13, the block 216 is intended to represent the flow controller electrical circuitry as a whole, apart from the terminals 150 and 152 of FIG. 11 and the variable DC voltage source 212 of FIG. 12. By way of further illustration, one particular illustrative element, a potentiometer 220, is shown in the block 216. Such a potentiometer, responsive to the relationship between the voltage across the terminals 150 and 152, and the command by an operator reflecting a desired flow rate, might then control the variable voltage output of the voltage source 212. Again, such circuit aspects, including the use of circuitry based on a variable DC voltage source, rather than, for example, circuitry based on an AC source or a source incorporating pulse-width modulation, are illustrative of electrical aspects of the flow controller 32 which are readily, conventionally accomplished and varied according to particular requirements, factors or choices. The details of such circuitry, apart from, for example, for the illustrative circuitry shown, a particular voltage level capability available from a variable voltage source, essentially are no different than the circuitry which is now commonly used or adaptable for use on mass flow controllers, and such details form no part of the invention. One example of wire that can be used for the actuator wire 56 is that sold under the name Stable Ohm, by California Fine Wire Co., which is made from a nickel-chromium material.

In FIG. 16, actuator parts of the flow controller 32 have been changed, while everything else remains the same. The actuation parts are modified to provide a normally-open form of operation for the valve. Thus, in this case, there is a modified input side 221 and a modified output side 222 tube about portions of an actuator wire 224. In this case, the output side tube 222 is fixed to the actuation portion 170 of the controller rod 52. Its outward threads are threaded into the inward threads of the threaded opening through such actuation portion 170. On the other hand, the input side tube 221 is attached to the tubular casing 225 for the upper part of the controller rod. Its outward threads are threaded into the inward threads of a casing opening 226, on the input side of the casing. The actuator wire connections at the ends of the tubes 221 and 222, with the use of insulator washers, metallic contact balls and electrical lead lines, are the same as described in connection with FIG. 4. Also, as in FIG. 4, although incorporated in the embodiment shown, the press-fit mounting of the washers and the attachment of each metallic contact ball to its associated washer, is not required, because the wire will be in tension in operation. A spring assembly 228, also, is as described in FIG. 4, but located and acting against the output side of the actuation portion 170 of the controller rod. In this case, then, the spring of the spring assembly will apply a force against the clockwise, closing movement of the normally-open valve, although this is not necessary because the wire will be in tension. More importantly, as in FIG. 4, the spring and spring assembly can be used in facilitating the initial adjustment of the normally-open position of the valve. Also, in FIG. 16, of course a lock nut 230 is used in locking the threaded attachment of the input side tube 221, as opposed to the output side lock nut of FIG. 4.

Figure 13:
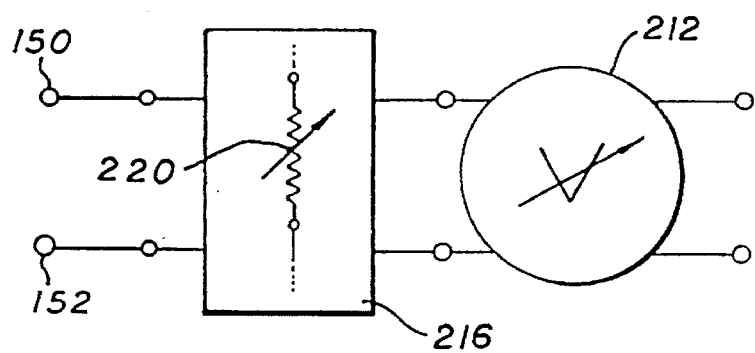
FIG. 13 illustrates how parts of the circuits of FIGS. 11 and 12 can fit in a larger circuit.

By reference to FIG. 16, and the prior description of the normally-closed operation of FIG. 4, it can readily be seen that, in FIG. 16, as the actuator wire 224 expands, the output side tube 222 moves, along with the actuator portion 170 of the controller rod 52 which moves clockwise, tending to a more closed valve, and a lesser flow rate. On the other hand, contraction of the actuator wire, permits the actuation portion 170 to move counterclockwise, with the opposite effect for the valve. In accordance with this sort of operation, of course, the interaction of a signal, e.g., a voltage level, representative of a set desired flow rate, and the signal representative of the actual flow rate, will be such that the output of the variable DC voltage source 212 of FIG. 12, will decrease with a desired increase in flow rate to contract the actuator wire 224, and increase with a desired decrease in fluid flow rate to expand the actuator wire. In this connection, the schematic electrical diagrams of FIGS. 12 and 13, are still applicable, with fully conventional variations in the implementation, at a level of conventional detail beyond that of FIGS. 12 and 13.

Concerning the actuator wire 224 in FIG. 16 being in tension, by analogy to the situation in FIG. 4, to accomplish this, during assembly, the outside tube 222 is turned counterclockwise to put the wire in sufficient tension, when cold, to allow maximum flow through the valve. Then heating the wire tends to close the valve, with the wire remaining in tension whether the valve is fully-closed, at its maximum open position or anywhere in between.

With regard to the valve actuator and controller mechanism, as described and shown, whether normally-closed or normally-open, several advantageous results should be noted. First, the pivotal operation of the valve facilitates the implementation of a straight primary fluid flow path. Thus, the fluid flow opening 62 through the input pipe section 40, the fluid flow opening 32 through the valve seat 48, the fluid flow opening 64 through the intermediate pipe section 42, and the fluid flow opening 66 through the output pipe section 44 are aligned. This is important in reducing or eliminating sensitivity of the valve operation to back pressure. This also can facilitate the use of off-the-shelf parts, welded together, in providing the primary fluid flow path—i.e., for the input pipe section 40, the intermediate pipe section 42 and the output pipe section 44. This can greatly add to the efficiency of manufacture.

Second, the use of a pivotal operation, as opposed to a linear operation, typically decreases the amount of force of which an actuator must be capable. This is of significance in the adoption of the thermal actuation using an actuator wire. Of course, in accordance with conventional variations, which will be readily apparent to those of ordinary skill in the art, the more conventional solenoid and piezo-electric type actuators can also readily be used with a pivotally mounted controller rod. In fact, by varying the lever arms, the amount of movement of the actuator required to cause a given movement of the controller rod at its gate-member contact end can be varied. For example, piezo-electric actuators typically have relatively small movements. By having the piezo-electric actuator connected close to the pivot point, its small movement can result in a much-enhanced amount of movement at the gate-member end of a controller rod. This, of course, is all in accordance with mechanical principles that are conventionally understood.

The connection of the sensor conduit 86 to communicate with the sensor conduit inlet opening 74 and the sensor conduit outlet opening 76 to the input pipe section fluid flow opening 62, as shown for example in FIGS. 2, 9 and 10, is substantially readily apparent from the prior description and the drawings. However, a number of aspects deserve additional focus. This initially may be done by reference to FIG. 10, where the inlet metallic sealer member 96, press-fit into the sensor conduit inlet opening 74, is shown. In that regard, as already indicated, the outlet metallic sealer member 100 is identical to the inlet metallic member, its mounting in the outlet sensor conduit opening 76 is analogous to that of the inlet metallic member in the inlet opening, and its attachment at the outlet end 82 of the sensor conduit 86 is analogous to the inlet metallic member attachment at the inlet end 80 of the sensor conduit.

So thus focusing on FIG. 10, as already indicated, the inlet member 96, because of the press-fit mounting, does not in fact require the force of the L-shaped bracket leg 130 to hold the structure in position. The member 96 can conveniently and efficiently be formed from an off-the-shelf ball bearing, e.g., of 316 stainless steel. The member has its spherically-shaped surface portion 98 extending into the sensor conduit inlet opening 74, to provide the press-fit. An opening 236 is formed through the member for the inlet end 80 of the sensor conduit 86. The opening narrows near the end of the conduit. Also, near the end of the conduit, three flat, annular surface portions are formed, to provide two step regions of the member. Thus, there is a flat, base surface portion 240, a flat, intermediate surface portion 242, and a flat peak surface portion 246, forming an intermediate step region 248 and a peak step region 250. This sort of form is convenient and efficient for both strength and, also, for the attachment of the inlet end 80 of the sensor conduit. Thus, the peak step region 250, is conveniently and efficiently used as a site to weld the end of the sensor conduit to the sealer member 96.

Now referring to FIG. 20, as already indicated, this is an alternative, comparable to the view of FIG. 10, again shown for the inlet end of the sensor conduit 86. The sealer member 134 of FIG. 20 is the same as the sealer member 96 of FIG. 10. And, as in FIG. 10, the end of the sensor conduit is welded to the same welding site. However, in this case, the force of the leg 130 of the L-shaped bracket is required to hold the sealer member in place, tightly against the inlet washer member 136 which is bent around the inlet corners 140 of the inlet sensor conduit opening 74. Thus, in this case, the washer member 136 is required to accomplish the fluid seal.

The radial expansion-fit method of mounting the valve seat bushing 46 in the intermediate pipe section 42 is apparent from the prior description and the drawings, in particular FIGS. 14 and 15. However, there is an additional aspect which may be noteworthy. Specifically, in FIGS. 14 and 15, the spherically-shaped surface portion 120 of the bushing 46 is formed by the application of the force against the conically-shaped surface portion 104. However, if this conically-shaped surface portion 104 did not exist, and the upstream end surface 102 of the bushing, prior to the deformation, had no such surface portion but was, along its full surface, perpendicular to the direction through the bushing, the deformation to a spherical-shape would still result from the shape of the deformation ball 112. However, more force and/or force over a longer period of time may be required.

As for some additional details and/or variations, the use of, e.g., 316 stainless steel material for a number of parts of the flow controller has been noted. That material, e.g., can also be used for a variety of other metallic parts, such as the gate-member ball, the actuator tubes, the primary fluid flow path pipe sections and the casing about the part of the controller rod above the diaphragm. Traditional vendors of fluid flow parts, such as Parker Hannifan and Cajon, are exemplary sources for the forms of such pipe sections. As with the washers associated with the actuator tubes, the valve seat can conveniently be made of, e.g., a ceramic or mica material.

For lower level flow rates, a diaphragm thickness of about 0.030 inch would be typical, with a thickness of 0.014 inch for higher level flow rates. Typical diameters for the cross-sections of the two circular, cylindrical sections of a controller rod along the mounting portion of the rod could be about 0.090 and 0.100 inch, with variations depending upon the particular uses and requirements of, e.g., from about 0.045 and 0.05 inch, to about 0.180 and 0.200 inch. Typical outer diameters for a sensor conduit might be, e.g., in the range of from 0.010 inch to 0.050 inch. For heating an actuator wire, available electrical power of in the range of from about 0.3 to 3 watts per inch might be expected, for example, in air. Matters and variations such as these, which are merely exemplary, of course, are all within conventional implementation capabilities of those of ordinary skill in the art.

In connection with both the normally-closed and normally-open valve configurations, and their actuation, in accordance with, e.g., FIGS. 4 and 16, respectively, it has already been observed that the primary purpose of the spring assemblies 204 and 228, respectively, is to facilitate adjustment of the controller rod 52, in each case, during assembly. As a result, however, the spring assembly, as also already observed, does also act during operation as somewhat of a resisting force against movement of the controller rod one way and as somewhat of a propelling force aiding movement of the controller the other way-functions which, in fact, are unnecessary since the actuator wires 56 and 224 are in tension.

In accordance with the primary purpose, and the lack of necessity for the secondary, resulting function, the spring assembly, in either case, in fact, can be mounted on either side of the tubular casing 186 or 225, respectively, for the portion of the controller rod above the diaphragm. Thus, in each case, the spring assembly could be analogously mounted, in mirror image fashion, on the opposite side of the tubular casing, with an opening for the assembly provided in such opposite side rather than as shown. Of course, the by-product result would then be some degree of resistance opposite to that shown and propelling opposite to that shown, resulting functions which, again, are not necessary due to the wire being in tension. For this alternative, the resisting is against the movement caused by contraction of the actuator wire and the propelling is of the movement cause by expansion of the actuator wire.

It, thus, of course, will be apparent to those skilled in the art that many modifications and variations may be made in the embodiments which have been described in detail without departing from the spirit or scope of the invention.

What is claimed is:

1. A fluid flow meter, comprising:
   pipe structure defining an inlet and an outlet for fluid having a flow rate to be measured and defining a tapered main fluid flow path opening through said structure;
   a flow restrictor lodged in said tapered opening to generate a fluid pressure drop along said opening, including a core structure and lengths of wire structure disposed along said core structure lodged between said core structure and said pipe structure in said tapered opening; and
   a fluid flow sensor including a fluid flow sensor conduit defining a sensor fluid flow path opening in parallel with said main fluid flow path opening having inlet and outlet openings positioned to provide a sensor conduit fluid flow responsive to said pressure drop.

2. A fluid flow meter as defined in claim 1 wherein:
   said core structure includes spherically-shaped structure.

3. A fluid flow meter as defined in claim 1 wherein:
   said core structure includes conically-shaped structure.

4. A fluid flow meter as defined in claim 1 wherein:
   said lengths of wire structure comprise three lengths of wire structure.

5. A fluid flow meter as defined in claim 1 wherein:
   said lengths of wire structure comprise four lengths of wire structure.

6. A fluid flow meter as defined in claim 1 wherein:
   said lengths of wire structure are deformed between said core structure and said pipe structure.

7. A fluid flow meter, comprising:
   a fluid flow sensor including a fluid flow sensor conduit having an inlet and an outlet and defining a sensor fluid flow path opening through said conduit;
   pipe structure defining an inlet and an outlet for fluid having a flow rate to be measured and defining a main fluid flow path opening through said structure in parallel with said sensor fluid flow path opening, said pipe structure having a sensor conduit inlet opening for the inlet end of said sensor conduit and a sensor Conduit outlet opening for the outlet end of said sensor conduit;

an inlet metallic sealer structure extending in said sensor conduit inlet opening and rounded, with said rounding including a direction extending along the direction through said opening, said sealer structure defining an opening through said structure for the inlet end of said sensor conduit; and an outlet metallic sealer structure extending in said sensor conduit outlet opening and rounded, with said rounding including a direction extending along the direction through said opening, said sealer structure defining an opening through said structure for the outlet end of said sensor conduit.

8. A fluid flow meter as defined in claim 7 wherein:

each of said inlet and outlet sealer structures includes a spherically-shaped surface portion extending in said associated sensor conduit opening.

9. A fluid flow meter as defined in claim 8 wherein:

each of said inlet, and outlet sealer structures includes a flat surface portion.

10. A fluid flow meter as defined in claim 7 wherein:

said sensor conduit is attached to said inlet and outlet sealer structures.

11. A fluid flow meter as defined in claim 7 wherein:

each of said inlet and outlet sealer structures is frictionally-fitted into said associated sensor conduit opening.

12. A fluid flow meter as defined in claim 7 wherein said pipe structure has a pair of inlet corners near said sensor conduit inlet opening and a pair of outlet corners near said sensor conduit outlet opening, further comprising:

an inlet washer structure bent between said inlet sealer structure and said inlet corners; and an outlet washer structure bent between said outlet sealer structure and said outlet corners.

13. A fluid flow meter, comprising:

a fluid flow sensor including a fluid flow sensor conduit having an inlet and an outlet and defining a sensor fluid flow path opening through said conduit;

pipe structure defining an inlet and an outlet for fluid having a flow rate to be measured and defining a main fluid flow path opening through said structure in parallel with said sensor fluid flow path opening, said pipe structure having a sensor conduit inlet opening for the inlet end of said sensor conduit and a sensor conduit outlet opening for the outlet end of said sensor conduit;

an inlet metallic sealer structure extending in said sensor conduit inlet opening rounded along the direction through said opening and defining an opening through said structure for the inlet end of said sensor conduit, said inlet sealer structure including a spherically-shaped surface portion extending in said inlet opening; and an outlet metallic sealer structure extending in said sensor conduit outlet opening rounded along the direction through said opening and, defining an opening through said structure for the outlet end of said sensor conduit, said outlet sealer structure including a spherically-shaped surface portion extending in said outlet opening.

14. A fluid flow meter as defined in claim 13 wherein each of said inlet and outlet sealer structures includes a flat surface portion.

15. A fluid flow meter as defined in claim 13 wherein said sensor conduit is attached to said inlet and outlet sealer structures.

16. A fluid flow meter as defined in claim 13 wherein each of said inlet and outlet sealer structures is frictionally-fitted into said associated sensor conduit opening.

17. A fluid flow meter as defined in claim 13 wherein said pipe structure has a pair of inlet corners near said sensor conduit inlet opening and a pair of outlet corners near said sensor conduit outlet opening, further comprising:

an inlet washer structure bent between said inlet sealer structure and said inlet corners; and an outlet washer structure bent between said outlet sealer structure and said outlet corners.

18. A fluid flow meter, comprising:

a fluid flow sensor including a fluid flow sensor conduit having an inlet and an outlet and defining a sensor fluid flow path opening through said conduit;

pipe structure defining an inlet and an outlet for fluid having a flow rate to be measured and defining a main fluid flow path opening through said structure in parallel with said sensor fluid flow path opening, said pipe structure having a sensor conduit inlet opening for the inlet end of said sensor conduit and a pair of inlet corners near said sensor conduit inlet opening, and having a sensor conduit outlet opening for the outlet end of said sensor conduit and a pair of outlet corners near said sensor conduit outlet opening;

an inlet metallic sealer structure extending in said sensor conduit inlet opening rounded along the direction through said opening and defining an opening through said structure for the inlet end of said sensor conduit;

an inlet washer structure bent between said inlet sealer structure and said inlet corners;

an outlet metallic sealer structure extending in said sensor conduit outlet opening rounded along the direction through said opening and defining an opening through said structure for the outlet end of said sensor conduit; and an outlet washer structure bent between said outlet sealer structure and said outlet corners.

19. A fluid flow meter as defined in claim 18 wherein each of said inlet and outlet sealer structures includes a flat surface portion.

20. A fluid flow meter as defined in claim 18 wherein said sensor conduit is attached to said inlet and outlet sealer structures.

21. A fluid flow meter as defined in claim 18 wherein each of said inlet and outlet sealer structures is frictionally-fitted into said associated sensor conduit opening.

* * * * *